(12) United States Patent
Malone et al.

(10) Patent No.: US 8,316,733 B2
(45) Date of Patent: Nov. 27, 2012

(54) ROTATIONAL COUPLING DEVICE

(75) Inventors: Anthony Wayne Malone, Lexington, KY (US); Glen Alan Reidhaar, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 410 days.

(21) Appl. No.: 12/553,167

(22) Filed: Sep. 3, 2009

(65) Prior Publication Data

US 2011/0048154 A1    Mar. 3, 2011

(51) Int. Cl.
*F16D 1/112*    (2006.01)
(52) U.S. Cl. ............ 74/451; 474/902; 474/903
(58) Field of Classification Search ............ 74/446, 74/447, 451, 405, 439; 403/1, 3, 4, 261, 403/359.1, 359.3–359.5; 474/902, 903; 464/182, 464/901; *F16D 1/06, 1/08, 1/10, 1/072, 1/076, F16D 1/096, 1/108, 1/112*
See application file for complete search history.

(56) References Cited

U.S. PATENT DOCUMENTS

| | | | | |
|---|---|---|---|---|
| 1,727,205 | A * | 9/1929 | Hobbs | 74/447 |
| 7,244,185 | B2 * | 7/2007 | Kamdem et al. | 464/75 |
| 8,064,800 | B2 * | 11/2011 | Carter et al. | 399/167 |

* cited by examiner

*Primary Examiner* — William C Joyce
*Assistant Examiner* — Terence Boes

(57) ABSTRACT

In an image printing device, such as a laser printer or ink jet printer, a coupling device for creating a coupling between a rotatable shaft and an interface component, such as a gear. The coupling device is an elongated modified c-shaped body having a portion for receiving the rotatable shaft, and includes integrated hinges that facilitate the coupling device to be spread apart and to receive and interface with the rotatable shaft. The integrated hinges function to compress between the rotatable shaft and interface component substantially inhibiting relative longitudinal movement and wherein a flat on the exterior of the rotatable shaft engages with a flat on the interior the interface component, to additionally inhibit relative rotational movement between the interface component and the shaft. The shaft further includes a plurality of ribs that extend from the rotatable shaft into the coupling device providing additional reduction in rotational movement between the shaft and the interface component. Retainers extending from the coupling device into the interface component provide another method of inhibiting relative rotational movement and/or provide a stop for press fit of the interface component onto the shaft.

7 Claims, 8 Drawing Sheets

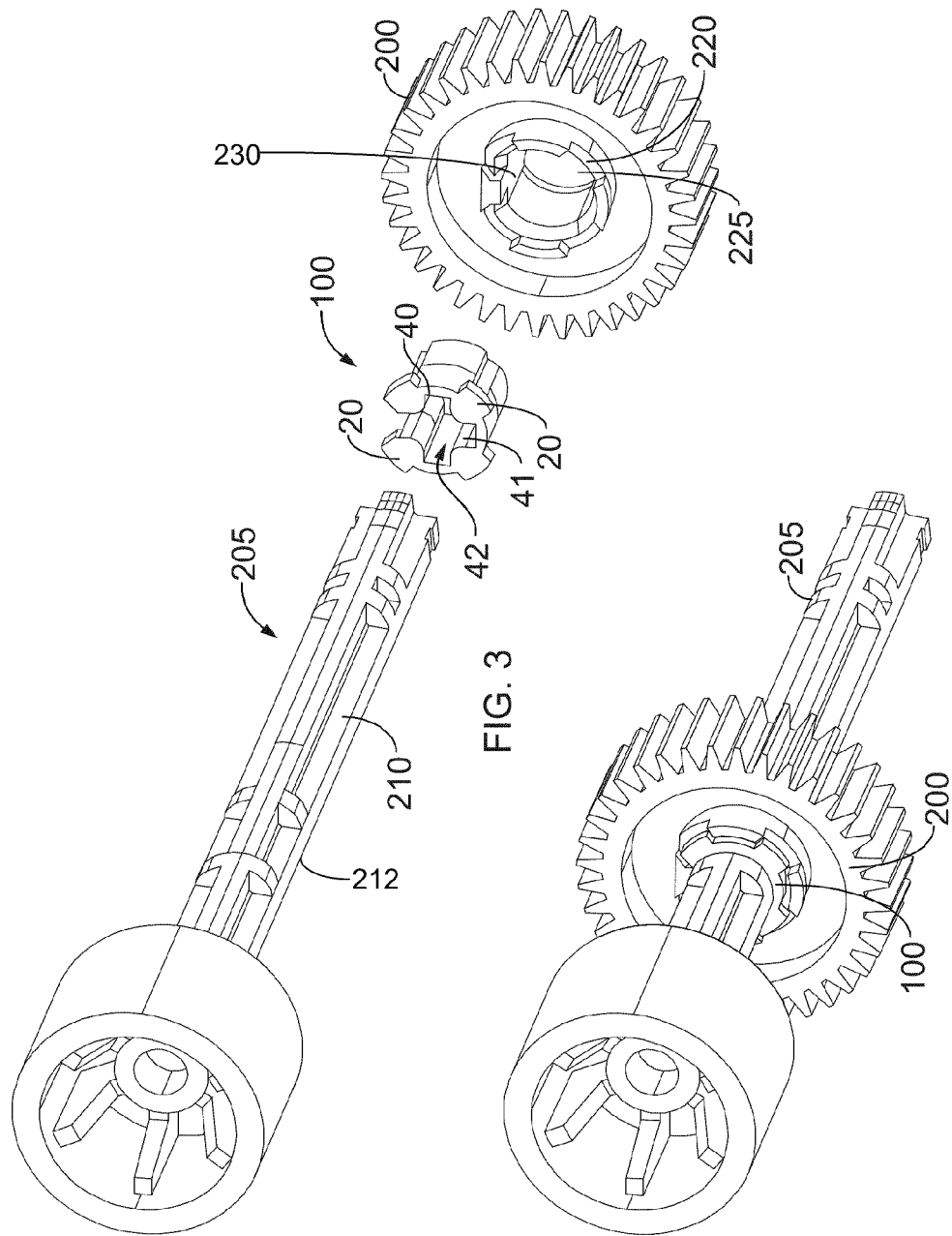

ROTATIONAL COUPLING DEVICE

CROSS REFERENCES TO RELATED APPLICATIONS

Not Applicable.

STATEMENT REGARDING FEDERALLY SPONSERED RESEARCH OR DEVELOPMENT

Not Applicable.

REFERENCE TO SEQUENTIAL LISTING, ETC.

Not Applicable.

BACKGROUND

1. Field of the Invention

The present invention relates to a rotational coupling device, more specifically but not by way of limitation, a device that facilitates the operable coupling of a shaft with a component such as a gear or pulley disposed within a standard printer.

2. Description of the Related Art

Most printers have disposed therein a plurality of operably connected components such as gears, pulleys and rolls that function to perform a variety of activities. For instance, these components function to move printing media through the print path or to move the printhead in a desired motion. Conventional shafts are routinely operably coupled with at least one gear and/or pulley. These conventional shafts are substantially hollow having a consistent wall thickness to allow for minimal manufacturing times and warp minimization. These shafts routinely use areas known as flats, which are regions in the shaft that have at least two sides. The number of flats disposed on the circumference of the shaft can vary depending on the application. The amount of flats used on shafts can be as few as one or numerous different amounts of flats can be utilized. The flats are generally planar in shape to facilitate the coupling of a gear or pulley having a mateable shape to the shaft.

One problem with utilizing flats is that the flats cannot be disposed substantially along the entire length of the shaft as this type of configuration will interrupt the journal surface at the ends of the shaft. A discontinuous journal surface has been shown to create problems, such as uneven wear, as the shaft rotates and other negative effects such as untimely breakdown of any lubrication or bad acoustics.

Commonly, a shaft disposed within a conventional printer will be supported at the ends by bushings which facilitate rotational coupling with pulleys or rolls outside the bushings. The shafts further require a method of providing a rotational coupling to a gear in the middle of its span. As the shaft must be inserted through the pair of bushings from one direction, this forces the designer to make compromises. More specifically, the bushings are commonly manufactured to be different diameters. This increases the number of parts in the printer. Also, one journal can end up being too small a diameter for strength requirements, and the other too large for friction and cooling requirements. Indeed, the resulting multiple stepping of the shaft diameter can create a problem wherein the diameter is either too small or too large at any of the various rotational and non-rotational interfaces along the shaft.

Accordingly, there is a need for a device that can provide rotational coupling between a shaft and another component that can eliminate the need for or substantially reduce the number of steps required in the shaft. Furthermore, the device should substantially encircle the shaft and be able to be temporarily expanded in order to be traversed across the shaft and secured in the desired location on the shaft. The securing of the device to the shaft should be able to be accomplished without utilization of additional mechanical or chemical methods. Additionally, it is desired that subsequent to the expansion of the device and placement in its desired position along the shaft that the device returns to a shape and size such that the device compresses against the shaft substantially inhibiting any longitudinal movement.

SUMMARY OF THE INVENTION

In accordance with one embodiment of the present invention, a device is provided to provide rotational coupling between a shaft and another component such as but not limited to a gear. The device comprises a semicircular shaped body having at least one hinge point wherein if outward pressure is applied to the ends of the semicircular shaped body the device expands so as to accommodate the reception of a shaft therethrough. Once the device has been traversed across the shaft to its desired position, the pressure is released from the ends of the semicircular shaped body thereby allowing the device to be biased towards its original state and slightly compress against the shaft. The shaft and device are then inserted through the desired component such as a gear wherein the gear is configured with a center hole to receive the device that is substantially encircling the shaft. The center hole of the gear is sized such that it causes compression on the device which compresses against the shaft such that any longitudinal or rotational movement of the device and gear is inhibited by the compression force of the device against the shaft. The device further includes at least one protruding surface that mateably connects with the gear or other component that has been mated thereto so as to further facilitate the securing of the gear to the apparatus.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 3 illustrates a perspective exploded view of an embodiment of the present invention in alignment with a shaft component of a printer;

FIG. 4 illustrates a perspective view of an embodiment of the present invention operably coupled with the shaft component of a printer;

DETAILED DESCRIPTION

Figure 1:
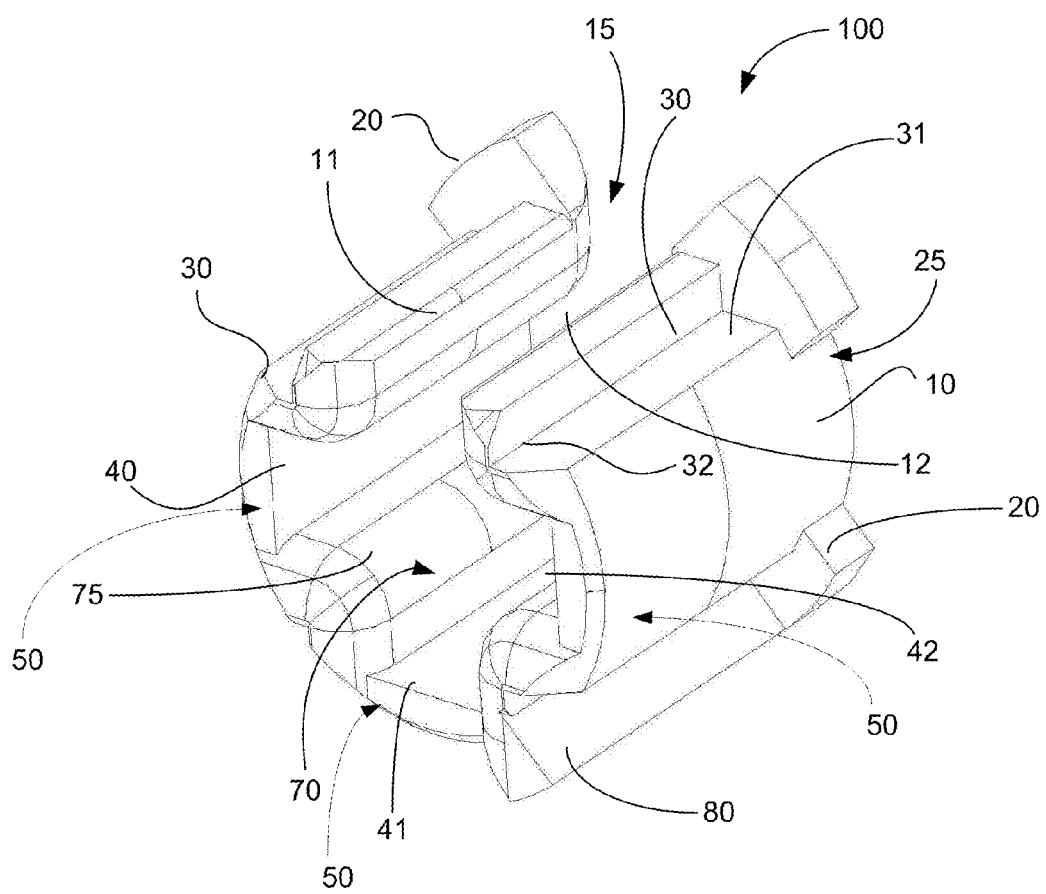
FIG. 1 shows a perspective view of an embodiment of the present invention.
Figure 2:
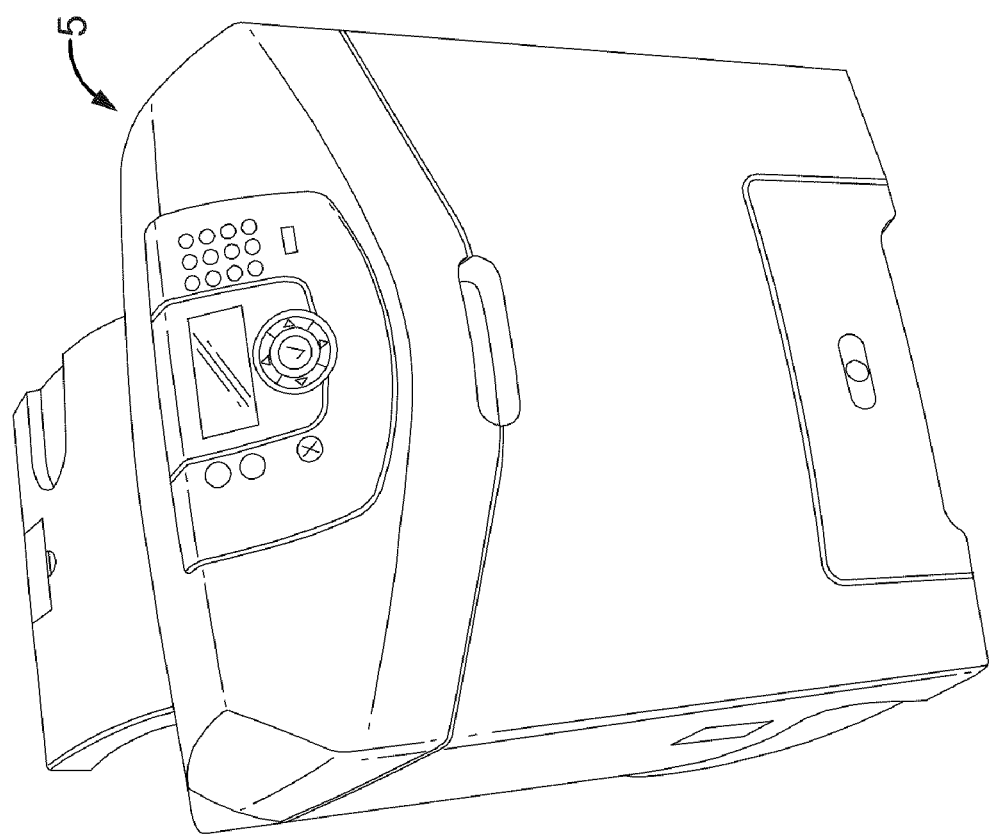
FIG. 2 illustrates a perspective view of an exemplary laser jet printer in which an embodiment of the present invention could be employed.

Referring now to the drawings submitted herewith, wherein various elements depicted therein are not necessarily drawn to scale and wherein through the views and figures like elements are referenced with identical reference numerals, there is illustrated a coupling device 100 constructed according to the principles of the present invention. It is to be understood that the invention is not limited in its application to the details of construction and the arrangement of components set forth in the following description or illustrated in the drawings. The invention is capable of other embodiments and of being practiced or of being carried out in various ways. Furthermore, it is to be understood that the phraseology and terminology used herein is for the purpose of description and should not be regarded as limiting. The use of "including", "comprising" or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings.

As shown in FIGS. 1 and 3, the coupling device 100 functions to provide a method of providing a rotational coupling between a shaft 205 with a mechanical component such as but not limited to a gear 200. The exemplary shaft 205 and gear 200 illustrated herein are conventional components that are utilized in a printer 5 to facilitate such tasks performed by the printer 5 but not limited to, moving a media through a print path or placing an inkjet cartridge or printhead in a desired location at a specific time. The coupling device 100 comprises a body 10 that is a modified c-shape having a slot 15 that extends longitudinally through the body 10. The body 10 is manufactured from a durable flexible material such as but not limited to polypropylene. The body 10 further includes a plurality of stops or retainers 20 that extend from the body 10 proximate one end 25. The retainers 20 are integrally formed with the body and function to provide a mechanical method of limiting the distance that the coupling device 100 can be inserted into the gear 200. The retainers 20 are shaped so as to be mateably connected with a notch 220 of the gear 200 with which the coupling device 100 is to be engaged as shown in FIG. 3.

The retainers 20 further function to reduce rotational movement between the coupling device 100 and the gear 200 subsequent to their being operably engaged. Retainers 20 could be formed in numerous different shapes and still provide the functionality as described herein. Furthermore, it is contemplated within the scope of the present invention that although four retainers 20 are illustrated in the drawings submitted herewith any number of retainers 20 could be formed with the body 10 and provide the same or similar function.

Four grooves 30 are formed into the body 10 and each extend longitudinally along the body 10 with each having a first end 31 proximate a corresponding retainer 20 and an opposing end 32. The grooves 30 function to provide consistent wall thickness between the channels 40, 41 and 42 for better moldability. It is contemplated within the scope of the present invention that the coupling device 100 can achieve its desired function as described herein without the presence of the grooves 30. While coupling device 100 is illustrated herein with four grooves 30, it is contemplated within the scope of the present invention that body 10 could be manufactured with any number of grooves depending upon the design of the component with which the coupling device 100 will be engaged. Furthermore, the shape of grooves 30 could be manufactured in numerous different shapes and still achieve the desired functionality as described herein.

A spline 80 is present parallel to grooves 30 and between channels 41 and 42. The spline 80 extends longitudinally substantially the length of the body 10 and extends outward from the body 10 in an angular manner. The spline 80 functions to engage with a mateably shaped notch of the gear 200 so as to substantially inhibit the rotational movement between the gear 200 and the coupling device 100. It is contemplated that the spline 80 could be manufactured having numerous configurations of length and could extend outward from the body 10 at numerous different angles. While good results have been achieved utilizing one spline 80, it is contemplated within the scope of the present invention that any number of splines 80 could be integrally formed with the body 10 in order to achieve the desired function as described herein. It is further contemplated within the scope of the present invention that the coupling device 100 could be manufactured such that a spline 80 is not necessary to reduce the rotational movement between the coupling device 100 and any device with which the coupling device 100 is operably engaged.

Three channels 40, 41 and 42 are integrally formed in the interior of the body 10 and extent longitudinally along the interior of the body 10. The channels 40, 41 and 42 function to engage the ribs 210 that are disposed along the exemplary shaft 205 as shown in FIG. 3. Subsequent to the shaft 205 being inserted through the opening 70 of the body 10 and the coupling device 100 being traversed along to the desired location on the shaft 205 the channels 40, 41 and 42 will engage with the ribs 210 on the shaft 205 and inhibit rotational movement between the shaft 205 and the coupling device 100. While the coupling device 100 illustrated herein has three channels shown, it is contemplated within the scope of the present invention that the actual number of channels within the body 10 of the coupling device 100 will be dependent upon the number of ribs 210 along exemplary shaft 205. Exemplary shafts such as the shaft 205 utilize ribs 210 to achieve constant wall thickness for better moldability. However not all shafts utilize ribs in their design. Although the exemplary shaft 205 illustrated herein has ribs 210 and the coupling device 100 has channels 40, 41 and 42 configured to engage therewith, it is contemplated within the scope of the present invention that the coupling device 100 could be designed with no channels so as to form a mateable shape with a shaft having no ribs (i.e. cylindrical, circular cross section). In this design the coupling device 100 would have an interior shape mateable to the exterior shape of the shaft. More specifically but not by way of limitation the shape could be C-shaped. A designer's discretion would determine what depth of channels 40, 41 & 42 to use for the rotational locking function of device 100 to shaft 205, and consequently the height of ribs 210 may be driven by this consideration rather than moldability. Similarly, if a cylindrical shaft with no ribs were chosen, a spline similar to 80 but protruding into the interior 75 of device 100, and a mating groove in shaft 205 could provide the rotational locking function of device 100 to shaft 205.

Integrally formed with the body are hinges 50 each being located adjacent and on opposing sides of the channel 41. The hinges 50 facilitate the operable coupling of a shaft 205 and a desired component such as but not limited to a gear 200. The body 10 of coupling device 100 is manufactured from a durable and flexible material such as the aforementioned polypropylene. In use, a user applies an outward pressure on edges 11 and 12 of coupling device 100 in generally opposing directions allowing the interior 75 of the body 10 to be opened to accommodate shaft 205. In this state, the hinges 50 flex in order to make the opening 70 slightly wider than the shaft 205 thus allowing a user to journal a shaft 205 therethrough and subsequently traverse the coupling device 100 across the shaft 205 to the desired position. Ensuing the release of the outward pressure on the edges 11 and 12 the hinges 50 compress and the body 10 of the coupling device 100 returns substantially to its original state providing a relatively zero tolerance frictional union between the coupling device 100 and the shaft 205. In this position on the shaft 205, the channels 40, 41 and 42 engage with the ribs 210 to substantially limit the rotational movement of the coupling device 100 with respect to the shaft 205 as the shaft 205 is rotated. The compression force of the hinges 50 further inhibits any longitudinal movement of the coupling device 100 along the shaft 205.

Subsequent to the coupling device 100 being secured to its desired position on the shaft 205, the user will insert the shaft 205 and coupling device 100 through an opening 225 of an exemplary component such as the gear 220. The opening 225 of the gear 200 is shaped to receive the coupling device 100 therethrough and further includes mateable shapes so that the gear 200 operably connects with the spline 80 and retainers 20, and, so the flat 230 inside gear 200 is brought in correct compressive contact with the flat region on the tip 212 of rib 210. It is conceived that variations of the invention can function relying upon both spline 80 and flat 230, or one or the other alone. As the coupling device 100 is journaled through the opening 225 of the gear 200 the hinges 50 compress between shaft 205 and gear 200 the further compression of coupling device 100 inhibits the slippage of gear 200 rotationally or lengthwise along shaft 205. The hinges 50 adjacent to channels 40 and 42 are on opposing sides of the shaft 205 in order to provide balance and centering of the gear 200 so that the centerline of gear 200 is coincident with the centerline of the shaft 205. The hinges 50 adjacent to channel 41 provide the compressive force to hold flat 230 inside gear 200 in contact with the tip 212 of rib 210.

Figure 5:
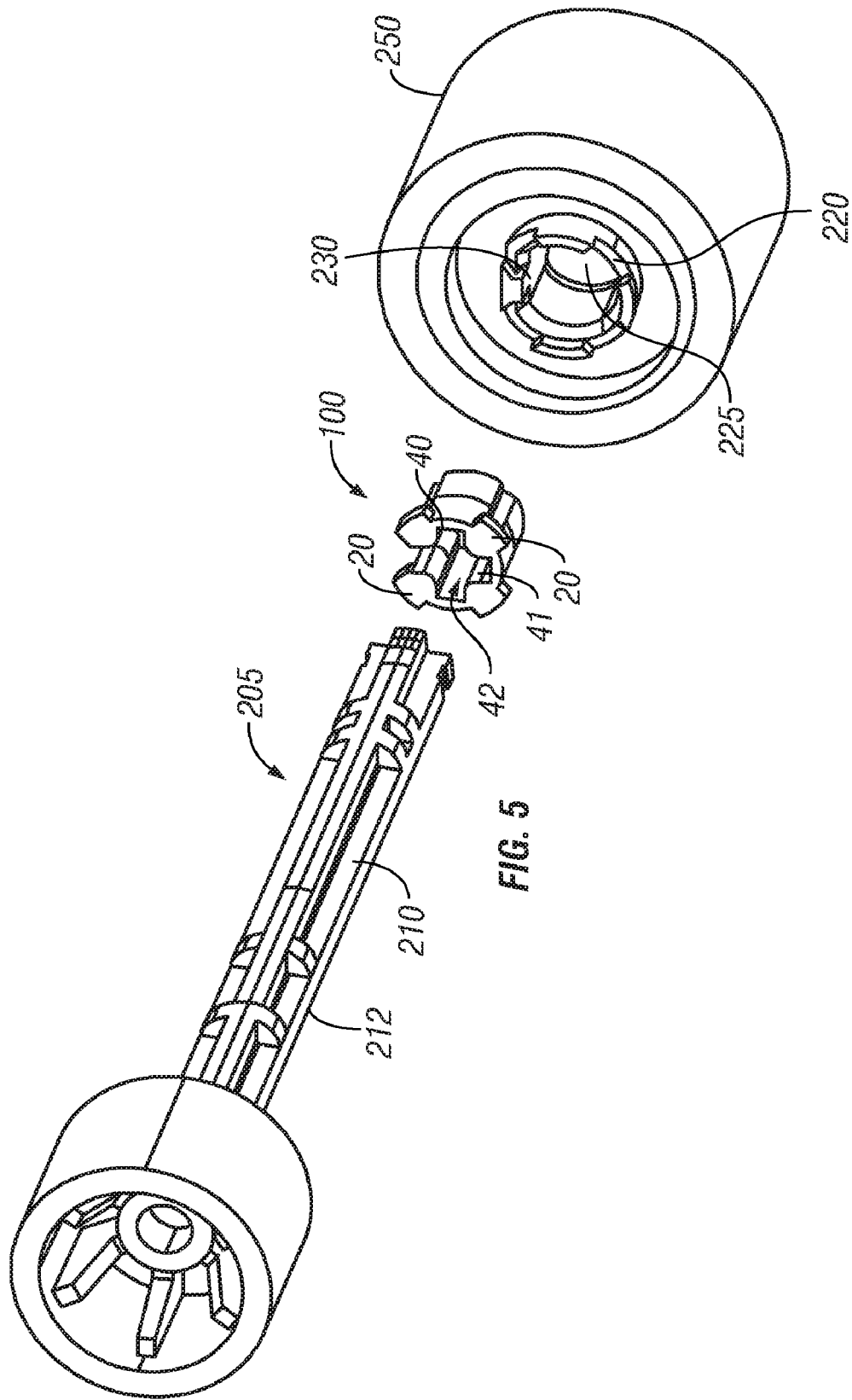
FIG. 5 is a perspective exploded view of an embodiment of the present invention in alignment with a shaft component and a pick tire component of a printer.
Figure 6:
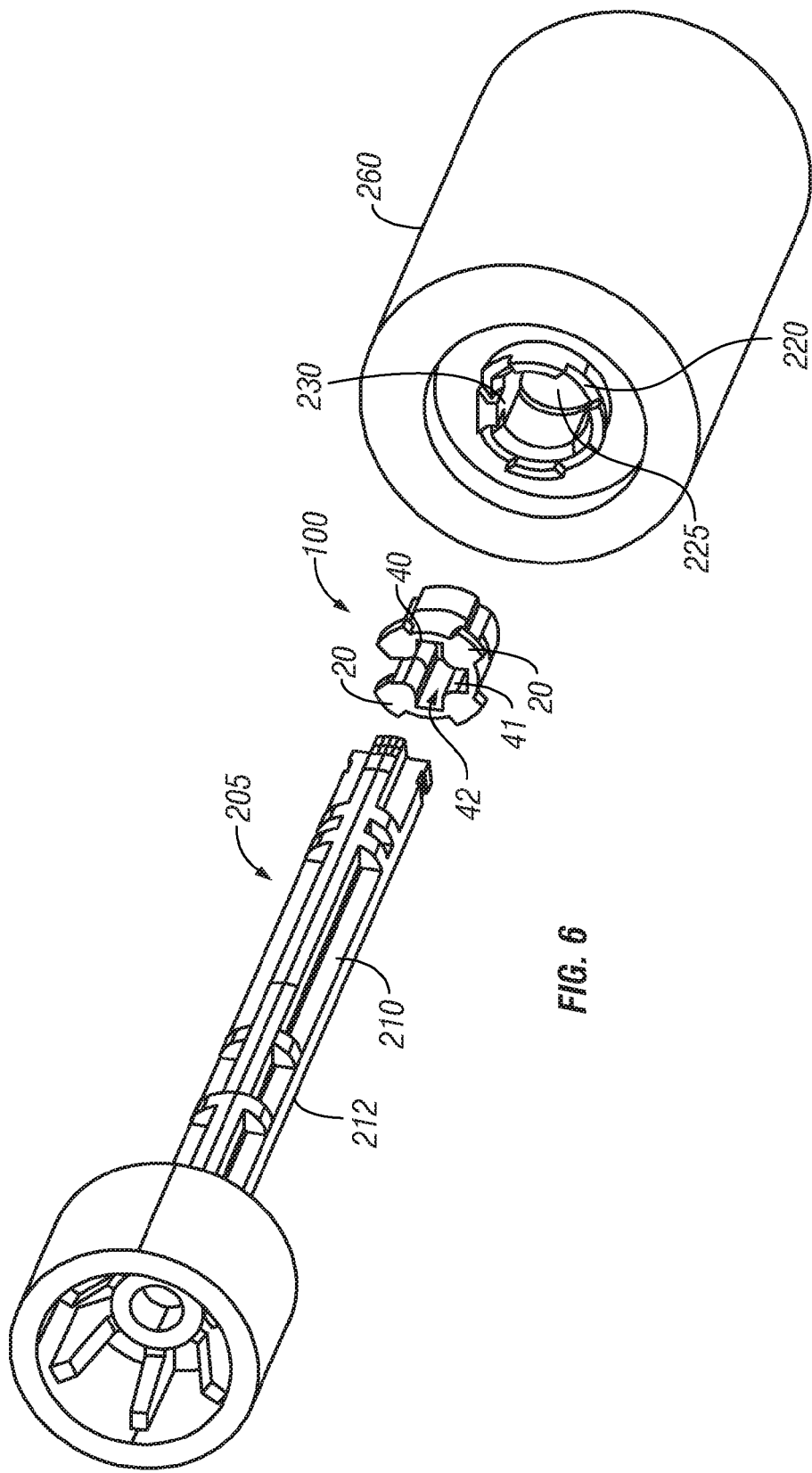
FIG. 6 is a perspective exploded view of an embodiment of the present invention in alignment with a shaft component and a roll component of a printer.
Figure 7:
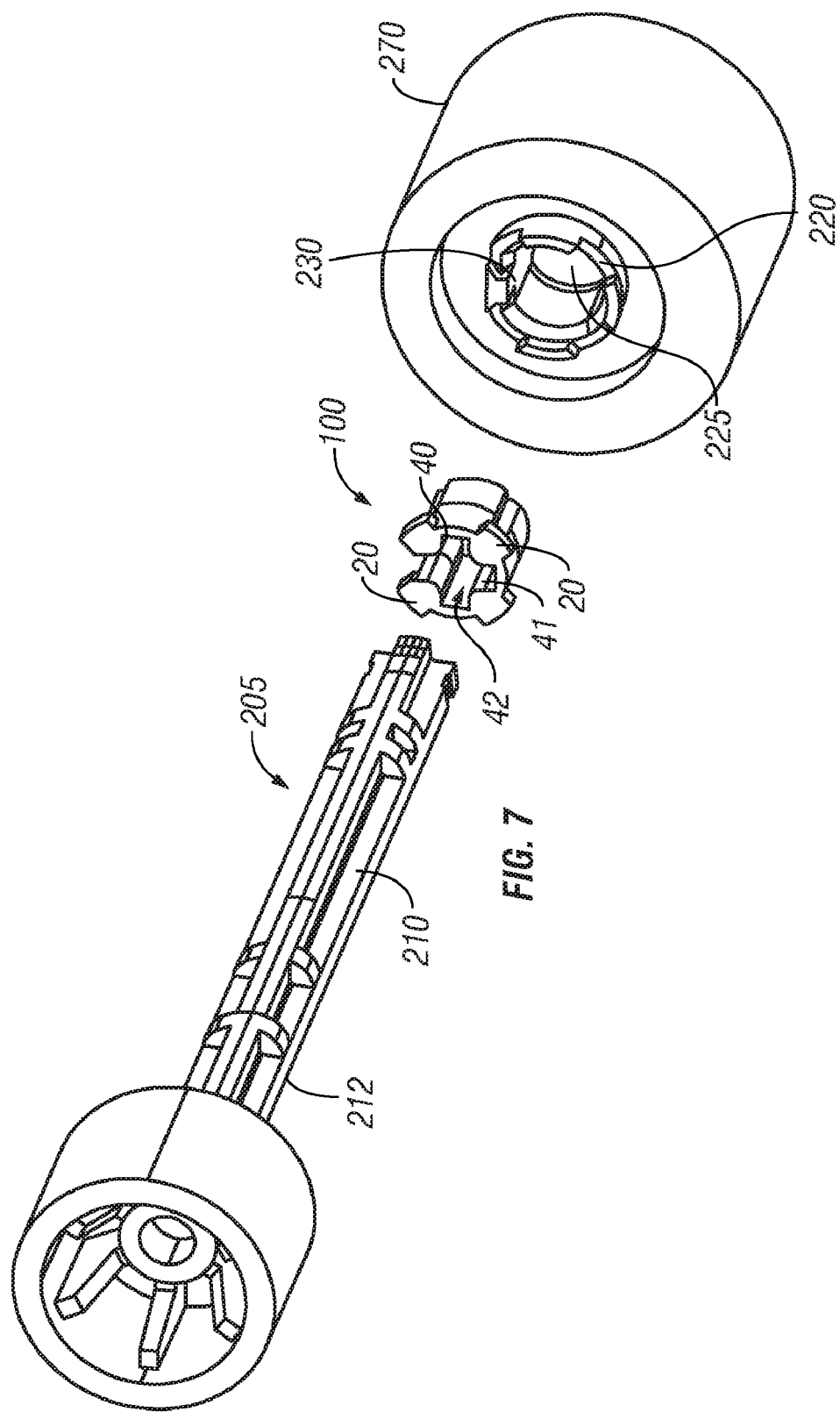
FIG. 7 is a perspective exploded view of an embodiment of the present invention in alignment with a shaft component and a wheel component of a printer.
Figure 8:
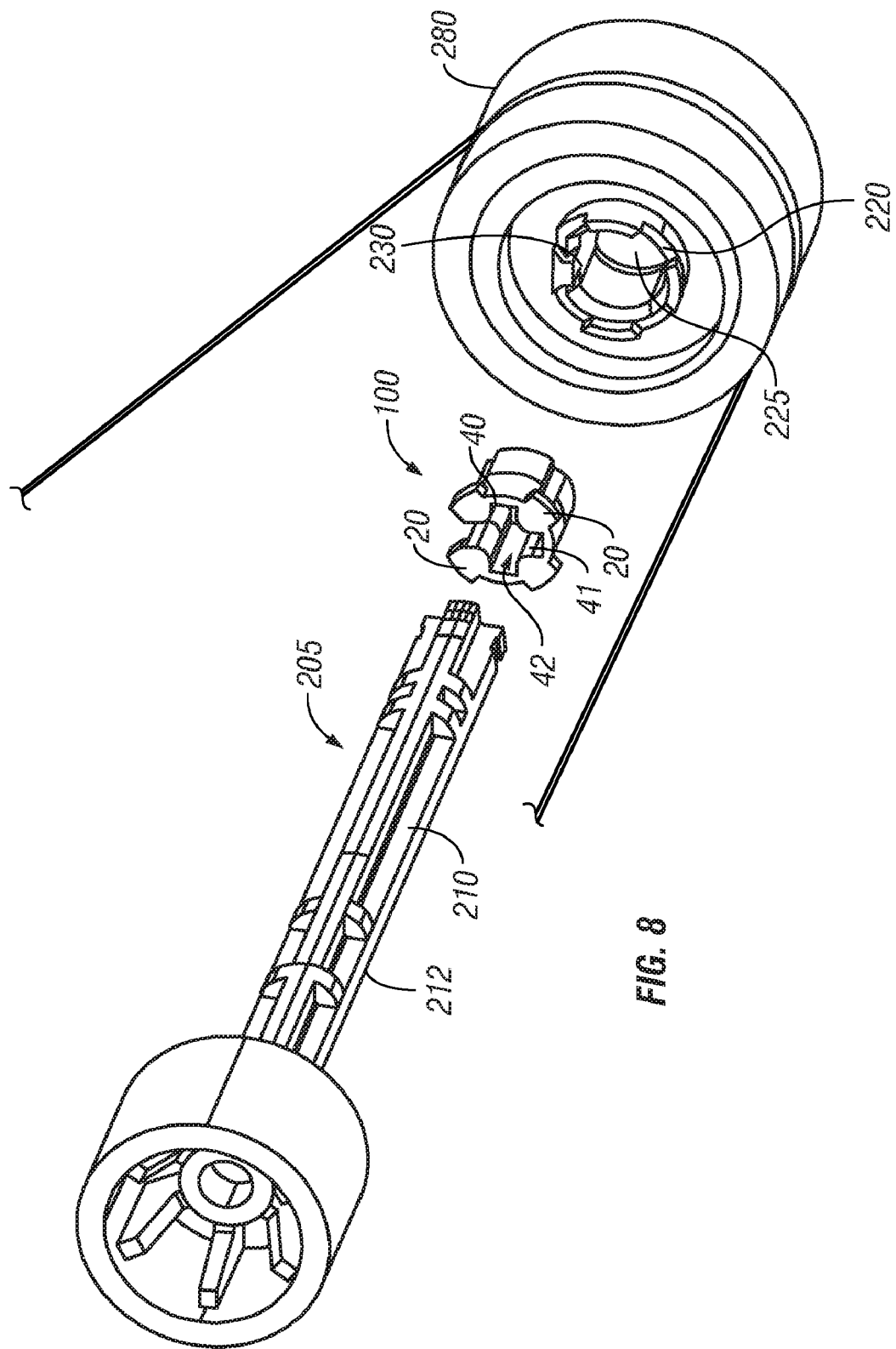
FIG. 8 is a perspective exploded view of an embodiment of the present invention in alignment with a shaft component and a pulley component of a printer.
Figure 9:
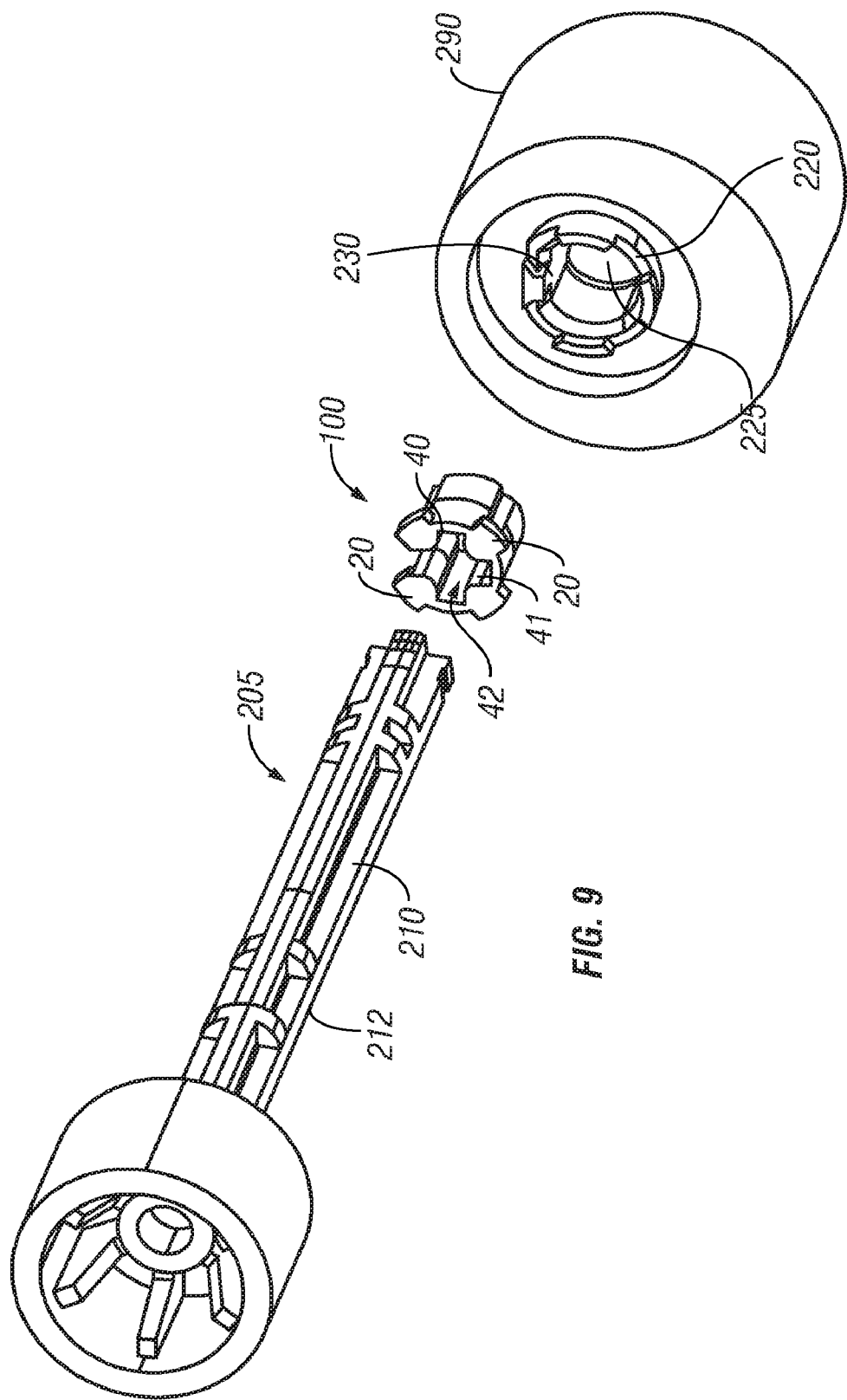
FIG. 9 is a perspective exploded view of an embodiment of the present invention in alignment with a shaft component and a cam component of a printer.

While the hinges 50 are generally angular in shape it is contemplated within the scope of the invention that numerous different shapes of hinges 50 could be utilized to achieve the functionality as described herein. Furthermore, it is contemplated within the scope of the present invention that numerous different configurations, shapes, and quantities of the channels 40, 41, and 42, grooves 30 and hinges 50 could be utilized to achieve the desired functionality of the coupling device 100 as described herein. Additionally, while the exemplary embodiment of the coupling device 100 is intended for use in the printer 5, it should be recognized that the coupling device 100 could be employed in numerous different systems or apparatuses wherein an operable connection between a shaft and a component are required wherein the user desires to substantially inhibit the rotational and longitudinal movement of the component with respect to the shaft or an alternate shaft design is desired. It is further contemplated within the scope of the present invention that although a gear 200 is illustrated herein (FIGS. 3 and 4) to be operably coupled to the shaft 205 numerous other components could be coupled to the shaft 205. More specifically but not by way of limitation, a pick tire 250 (FIG. 5), a roll 260 (FIG. 6), a wheel 270 (FIG. 7), a pulley 280 (FIG. 8) or a cam 290 (FIG. 9) could be operably coupled to the shaft 205 utilizing the coupling device 100 as described herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A printer comprising:
an elongated shaft having a first end and a second end, the shaft having at least three flat portions between the first and second ends;
an interface component having an aperture extending through at least a portion of the interface component;
a coupling device coupling the interface component to the shaft, the coupling device being a generally modified c-shape, the coupling device having an internal surface and an external surface;
wherein the coupling device further includes an opening providing access to the internal surface and further for facilitating the receiving of the shaft within the coupling device;
the coupling device including at least one hinge operable to modify the size of the opening of the coupling device to receive and secure the shaft therein; and
the external surface of the coupling device engaging the aperture of the interface component, such that when the coupling device is placed about the shaft and the external surface of the coupling device is engaged with the aperture of the interface component, the rotation of the shaft causes rotational movement of the interface component;
wherein the coupling device directly contacts and is directly coupled to both the shaft and the interface component such that the coupling device is a one-piece member for coupling the shaft and the interface component, wherein the internal surface of the coupling device includes at least three channels, the at least three channels being configured to couple to the at least three flat portions of the shaft, and wherein the coupling device further includes a plurality of retainers, said retainers extending from the external surface of the coupling device, engaging the interface component and limiting the distance the coupling device can be inserted into the interface component.

2. The printer as recited in claim 1, wherein the interface component is selected from one of the following: a gear, a pulley, a pick tire, a wheel or a roll, cam.

3. A printer comprising:
an elongated shaft having a first end and a second end, the shaft having at least two flat portions between the first and second ends;
at least one gear having an aperture, wherein the interior of the aperture further includes at least one flat;
a coupling device coupling the at least one gear to the shaft, the coupling device being a generally a modified c-shape, the coupling device having an internal surface and an external surface;
wherein the coupling device further includes an opening providing access to the internal surface and further for facilitating the receiving of the shaft within the coupling device;
the coupling device including at least one hinge, the at least one hinge operable to modify the size of the opening of the coupling device to receive and secure the shaft therein; and
the external surface of the coupling device engages the aperture of the at least one gear, such that when the coupling device is placed about the shaft, the external surface of the coupling device is engaged with the aperture of the at least one gear, and the internal surface of the coupling device engages with the at least two flat portions of the elongated shaft, the rotation of the shaft causes rotational movement of the at least one gear;
wherein the coupling device further includes a plurality of retainer members extending outwardly from the external surface of the coupling device at an proximate end thereof, the retainer members operably engaging with the at least one gear and limiting a depth into which the coupling device is inserted into the gear; and
wherein the coupling device directly engages with and is directly coupled to both the shaft and the at least one gear such that the coupling device is a one-piece member for coupling the shaft and the at least one gear.

4. The printer as recited in claim 3, wherein the coupling device includes an axis about which the shaft rotates, the at least one hinge extending generally parallel with the axis, the at least one hinge configured to facilitate the flexing and compressing of the coupling device.

5. The printer as recited in claim 4, wherein the internal surface of the coupling device includes at least one channel, the channel configured to couple with one of the at least two flat portions of the shaft, the channel for facilitating contact between the shaft and the gear.

6. The printer as recited in claim 5, wherein the external surface of the coupling device includes at least one spline, the at least one spline being configured to mate with at least a portion of the aperture of the gear.

7. The printer as recited in claim 6, wherein the internal surface of the coupling device includes a second channel, the second channel being configured to couple with one of the at least two flat portions of the shaft.

* * * * *